United States Patent [19]

McNutt et al.

[11] Patent Number: 4,496,612
[45] Date of Patent: Jan. 29, 1985

[54] AQUEOUS FLUX FOR HOT DIP METALIZING PROCESS

[75] Inventors: James E. McNutt, Wilmington; Robert J. Scott, Newark; Charles W. Welch, New Castle, all of Del.

[73] Assignee: E. I. Du Pont de Nemours and Company, Wilmington, Del.

[21] Appl. No.: 565,773

[22] Filed: Dec. 27, 1983

Related U.S. Application Data

[63] Continuation-in-part of Ser. No. 369,076, Apr. 6, 1982, abandoned.

[51] Int. Cl.$^3$ .................. B05D 3/04; B23K 35/34
[52] U.S. Cl. ........................................ 427/310; 148/26
[58] Field of Search ............... 427/310, 311, 312, 313; 75/93 A; 427/329; 148/26

[56] References Cited

U.S. PATENT DOCUMENTS

| | | | |
|---|---|---|---|
| 92,998 | 7/1869 | Peake | 148/26 |
| 1,914,269 | 6/1933 | Liban | 427/329 X |
| 2,179,258 | 11/1939 | Howarth | 148/26 |
| 3,740,275 | 6/1973 | Heins | 148/26 |
| 3,806,356 | 4/1974 | Shoemaker | 117/50 |
| 3,816,188 | 6/1974 | Chay | 148/26 |
| 3,988,175 | 10/1976 | Baker et al. | 148/26 |
| 4,152,471 | 5/1979 | Schnedler et al. | 427/310 |

*Primary Examiner*—Sam Silverberg

[57] ABSTRACT

A flux bath and its use in treating ferrous articles prior to their being dipped in a molten aluminum-zinc alloy is disclosed. The flux may be molten bath or used as an aqueous solution which contains from 200 to 750 g/l dissolved solids. The dissolved solids are 91 to 98.5 wt. % zinc chloride, 1.5 to 9 wt. % ammonium chloride and, based on zinc chloride and ammonium chloride, from 0.6 to 3 wt. % fluoride ions.

10 Claims, No Drawings

AQUEOUS FLUX FOR HOT DIP METALIZING PROCESS

CROSS REFERENCE TO RELATED APPLICATION

This application is a continuation-in-part of Ser. No. 369,076 filed Apr. 6, 1983, now abandoned.

BACKGROUND OF THE INVENTION

1. Field of the Invention

The present invention relates to a zinc chloride based flux and its use in treating ferrous acticles prior to being coated with an aluminum-zinc alloy.

2. Prior Art

U.S. Pat. No. 92,998 discloses an aqueous galvanizing flux containing ammonium chloride, zinc chloride, and potassium chloride.

U.S. Pat. No. 1,914,269 discloses a molten salt flux bath containing zinc chloride, ammonium chloride, and a fluorine compound.

U.S. Pat. No. 3,740,275 discloses an aqueous flux containing zinc chloride, borax or boric acid, potassium aluminum fluoride, sodium chloride, and either barium chloride or calcium chloride.

U.S. Pat. No. 3,806,356 discloses an aqueous flux containing various combinations of fluorosilicic acid, hydrochloric acid, hydrofluoric acid, potassium fluoride, and zinc chloride.

U.S. Pat. No. 3,816,188 discloses an aqueous flux containing zinc chloride or zinc bromide and a zinc phosphate or zinc phosphite and optionally a foaming agent and a chloride or bromide of any of sodium, potassium, lithium magnesium and/or calcium.

SUMMARY OF THE INVENTION

The present invention relates to a flux for the treatment of ferrous articles prior to dipping in a molten bath of aluminum and zinc. The aqueous flux contains zinc chloride, ammonium chloride, and one or more of sodium fluoride, ammonium fluoride, or ammonium bifluoride in the hereinbelow set forth critical amounts.

DETAILED DESCRIPTION

Ferrous articles to be coated generally are cleaned of grease and scale (iron oxides) prior to the application of the metallic coating. In a continuous operation, i.e., strip or wire, the material is generally cleaned and then maintained in an oxide reducing atmosphere until it is immersed in a molten metal coating bath. When using the aqueous flux of the present invention, it is unnecessary to maintain the ferrous article in a reducing atmosphere between the fluxing step and the coating step. The aqueous flux of the present invention is intended for use in fluxing ferrous articles such as steel strip prior to being coated in a molten metal bath containing from 5 to 70 weight % aluminum, 95 to 30 weight % zinc, and if desired, up to about 3 weight percent, based on the aluminum present, silicon. It is also useful for fluxing articles that are processed in a noncontinuous fashion, by dipping individually or in groups. The flux may be used as molten flux or in aqueous solution.

Generally the aqueous flux of the present invention will contain from 200 to 750 g/l and preferably from 400 to 600 g/l of dissolved solids. The dissolved solids consist essentially of zinc chloride, sodium fluoride, and ammonium chloride. If desired, other fluoride salts such as ammonium fluoride, ammonium bifluoride or potassium fluoride can be substituted for sodium fluoride on an equivalent fluoride basis. Generally the flux solids (whether used as a molten bath or an aqueous solution) will comprise from 91 to 98.5 percent by weight zinc chloride, from 1.5 to 9 percent by weight ammonium chloride and, based on zinc chloride and ammonium chloride, from 0.6 to 2 percent by weight fluoride ion. For use when the molten metal is 5 weight % aluminum and 95 weight % zinc the preferred flux contains as dissolved solids 91 to 97 percent by weight zinc chloride from 3 to 9 percent by weight ammonium chloride and, based on zinc chloride and ammonium chloride, from 1 to 3 percent by weight fluoride ion. For use when the molten metal is 55 percent by weight aluminum, 43.5 percent by weight zinc and 1.5 percent by weight silicon the preferred flux contains as dissolved solids from 95 to 98.5 percent by weight zinc chloride from 1.5 to 5 percent by weight ammonium chloride and, based on zinc chloride and ammonium chloride, from 0.6 to 2 percent by weight fluoride ion. Immersion times are generally from 3 to 30 seconds for a continuous line and vary with the thickness of the metal to be coated, the amount of preheat and the thickness of coating desired. For large structural pieces much longer times may be required.

Wetting agents may be added to the flux solution if desired.

Optionally, pH can be controlled to get high concentrations of salts in solution. Thus, the pH may be adjusted downward below the natural pH, for example down to pH2. Hydrochloric acid is preferred for this purpose. Generally, the flux bath will be used at temperatures from ambient to 60° C.

EXAMPLES

In each of the Examples the zinc chloride reported is a commercial grade of zinc chloride containing 95 wt. % zinc chloride, 1.7 wt. % ammonium chloride, 1.15 wt. % zinc oxide and the remainder minor impurities.

EXAMPLE 1

Steel panels measuring 2 inches (0.05 m) by 4 inches (0.1 m) are hung on steel wires and pickled in 15% hydrochloric acid for one minute at room temperature. The panels are rinsed with water and then rinsed with methyl alcohol to remove all the water. The panels are immersed in the aqueous flux at 180° F. (82° C.) for 30 seconds and then hung vertically in an oven at 220° F. (104° C.) for a minimum of 5 minutes. The flux is an aqueous solution containing 2 lb per gallon (240 Kg/m$^3$) of a solid composition consisting of 95.5 wt. % zinc chloride, 2.5 wt. % sodium fluoride, and 2.0 wt. % ammonium chloride. The pH of the flux bath is adjusted to pH2 by addition of hydrochloric acid to fully dissolve the fluoride components. Each panel is hung on a rack which automatically immerses the panel in a bath of a molten alloy of 5 wt. % aluminum, 0.04 wt. % cerium, 0.02 wt % lanthanum and the remainder zinc maintained at 450° C. for a preset time and then removes it. Just before the panel is immersed, the molten alloy bath is skimmed to remove surface oxides. Skimming is done again before removal of the panel to remove flux residues as well as surface oxides.

EXAMPLE 2

Example 1 is repeated except the solids used to prepare the aqueous flux are 91 wt. % zinc chloride, 3 wt. % sodium fluoride and 6 wt. % ammonium chloride.

EXAMPLE 3 (CONTROL)

Example 1 is repeated except the solids used to prepare the aqueous flux are 80 wt. % zinc chloride, 10 wt. % sodium fluoride and 10 wt. % ammonium bifluoride.

EXAMPLE 4 (CONTROL)

Example 1 is repeated except the solids used to prepare the aqueous flux are commercial flux products whose important components are 55.5 wt. % zinc chloride 42.7 wt. % ammonium chloride and 0.1 wt. % of a liquid nonionic ethylene oxide condensate wetting agent and the pH of the flux bath is not adjusted.

EXAMPLE 5 (CONTROL)

Example 1 is repeated except the solids used to prepare the aqueous flux are 95 wt % zinc chloride and 5 wt. % ammonium chloride.

EXAMPLE 6

Example 1 is repeated except the flux is an aqueous solution containing 2 lb. per gallon (240 Kg/m$^3$) of a solid composition containing 94 wt. % zinc chloride, 4 wt. % sodium fluoride, and 2 wt. % ammonium chloride.

EXAMPLE 7

Example 1 is repeated except the flux is an aqueous solution containing 2 lb. per gallon (240 Kg/m$^3$) of a solid composition containing 94 wt. % zinc chloride, 2 wt. % sodium fluoride, and 4 wt. % ammonium chloride.

EXAMPLE 8

Example 1 is repeated except the flux is an aqueous solution containing 2 lb. per gallon (240 Kg/m$^3$) of a solid composition containing 91 wt. % zinc chloride, 5 wt. % sodium fluoride, and 4 wt. % ammonium chloride.

EXAMPLE 9

Example 1 is repeated except the flux is an aqueous solution containing 2 lb. per gallon (240 Kg/m$^3$) of a solid composition containing 92.5 wt. % zinc chloride, 3.4 wt. % ammonium bifluoride, and 4.1 wt. % ammonium chloride.

EVALUATION OF EXAMPLES 1-9

All of tne fluxes were tested using 5 and 15 second periods in the molten alloy bath. All of the fluxes of Examples 1-9 produced complete coating of the panel. The fluxes of Examples 1, 2, and 6-8 produced significantly better coatings than the fluxes of Examples 3, 4, and 5. The coatings produced using the fluxes of Examples 1, 2, and 6-8 were quite smooth and had well defined spangles. The flux of Example 3 gave somewhat poorer results than the fluxes of Examples 1, 2, and 6-8. Next in order was the flux of Example 5 and then the flux of Example 4, both of which gave considerably poorer results. The flux of Example 8 gave the best results with the flux of Example 7 a close second.

EXAMPLES 10-19

In Examples 10-19 steel panels measuring 3 inches by 5 inches by 0.0145 inch (7.62 cm by 12.7 cm by 0.037 cm) are cleaned by pickling in warm aqueous 10% hydrochloric acid for two minutes. Following an immersion in the aqueous flux, which is heated up to 177° F. (77° C.), the panels are dried in a vertical position in an oven at 200° C. After drying, the panels are immersed in a 3.5 inch (0.089 m) inside diameter by 6 inch (0.015 m) deep bath of 55 wt % aluminum, 43.5 wt % zinc and 1.5 wt % silicon maintained at 1110° to 1130° F. (599°-610° C.) for up to 30 seconds. The surface oxides of the molten bath are removed by skimming both before immersion and before removal of the panel. After removal from the molten bath, the panels are air cooled. The panels are evaluated by a three judge panel as to percentage of area covered and as to surface smoothness. As to smoothness, the three judge panel independently examined the strips and rated them on a scale of 1 to 4 where 1 is roughest, 2 is fairly rough, 3 is light or scattered roughness, and 4 is smoothest.

One series of coated articles was prepared using the flux solutions reported in Table I with the results shown.

TABLE I

| Example No. | Solids g/l | NaF % | NH$_4$Cl % | ZnCl$_2$ % | Coverage % | Smoothness Rating |
|---|---|---|---|---|---|---|
| 10 | 240 |   |   | 100 | 94 | 3 |
| 11 | 240 | 5 |   | 95 | 96 | 3.7 |
| 12 | 240 |   | 5 | 95 | 94 | 3 |
| 13 | 240 | 7 | 8 | 85 | 94 | 1.7 |
| 14 | 480 | 2 | 8 | 90 | 99 | 4 |
| 15 | 480 | 0 | 5 | 95 | 99 | 3.7 |

EXAMPLE 16

Example 10 is repeated except the flux is an aqueous solution containing 4 lb./gallon (480 Kg/m$^3$) of a solid composition containing 97 wt. % zinc chloride, 1.5 wt. % ammonium chloride and 1.5 wt. % sodium fluoride to which has been added 0.4 wt. % Merpol® SH, a liquid fatty alcohol ethylene oxide condensation product surface active agent.

EXAMPLE 17

Example 10 is repeated except the flux is an aqueous solution containing 4 lb./gallon (480 Kg/m$^3$) of a solid composition containing 94.75 wt. % zinc chloride, 3.75 wt. % ammonium chloride and 1.5 wt. % sodium fluoride, to which has been added 0.4 wt. % Merpol® SH.

EXAMPLE 18

Example 10 is repeated except the flux is an aqueous solution containing 4 lb./gallon of a solid composition containing 97.5 wt. % zinc chloride, 1.0 wt. % ammonium bifluoride, and 1.5 wt. % ammonium chloride.

EXAMPLE 19

Example 10 is repeated except that the flux is an aqueous solution containing 4 lb./gallon of a solid composition containing 96.95 wt. % zinc chloride, 2.55 wt. % ammonium bifluoride, and 1.5 wt. % ammonium chloride.

The fluxes of Examples 16-19 all produced complete coating of the panel and a good quality coating. Example 18 was the best of Examples 10-19.

We claim:

1. A flux consisting essentially of 91 to 98.5 percent by weight zinc chloride, from 1.5 to 9 percent by weight ammonium chloride and, based on zinc chloride and ammonium chloride, from 0.6 to 3 percent by weight fluoride ions.

2. An aqueous flux bath containing from 200 to 750 grams per liter of the flux of claim 1.

3. The aqueous flux bath of claim 2 wherein the fluoride ion is present as sodium fluoride, potassium fluoride, ammonium fluoride, or ammonium bifluoride.

4. The aqueous flux bath of claim 3 wherein the bath contains from 400 to 600 grams per liter of dissolved solids.

5. In a process of coating a ferrous article with an alloy containing from 5 to 70 weight percent aluminum, 95 to 30 weight percent zinc, and up to 3 weight percent silicon the improvement which comprises treating the article in an aqueous flux bath, which aqueous flux bath contains from 200 to 750 grams per liter dissolved solids which solids comprise of 91 to 98.5 weight percent zinc chloride, from 1.5 to 9 weight percent ammonium chloride and, based on zinc chloride and ammonium chloride, from 0.6 to 3 weight percent fluoride ions, and contacting the fluxed article with molten aluminum zinc alloy.

6. The process of claim 5 wherein the fluoride ion is present as sodium fluoride, potassium fluoride, ammonium fluoride, or ammonium bifluoride.

7. The process of claim 6 wherein the alloy being coated contains about 5 weight percent aluminum and about 95 weight percent zinc and the dissolved solids in the aqueous flux bath consist essentially of 91 to 97 weight percent zinc chloride from 3 to 9 weight percent ammonium chloride and, based on zinc chloride and ammonium chloride, from 1 to 3 weight percent fluoride ion.

8. The process of claim 6 wherein the alloy being coated contains about 55 weight percent aluminum, about 43.5 weight percent zinc and about 1.5 weight percent silicon and the dissolved solids in the aqueous flux bath consist essentially of from 95 to 98.5 weight percent zinc chloride from 1.5 to 5 weight percent ammonium chloride, and based on zinc chloride and ammonium chloride, from 0.6 to 2 weight percent fluoride ion.

9. The process of claim 8 wherein the aqueous flux bath contains from 400 to 600 grams per liter of dissolved solids.

10. In a process of coating ferrous article with an alloy containing from 5 to 70 weight percent aluminum, 95 to 30 weight percent zinc and up to 3 weight percent silicon the improvement which comprises treating the article in a molten flux bath comprising 91 to 98.5 weight percent zinc chloride, 1.5 to 9 weight percent ammonium chloride, and based on the zinc chloride and ammonium chloride from 0.6 to 3 weight percent fluoride ion derived from sodium fluoride, potassium fluoride, ammonium fluoride, or ammonium bifluoride.

* * * * *